Jan. 18, 1927.  W. REGELEIN ET AL  1,614,573
OSCILLATION METER
Filed Nov. 17, 1925   2 Sheets-Sheet 1
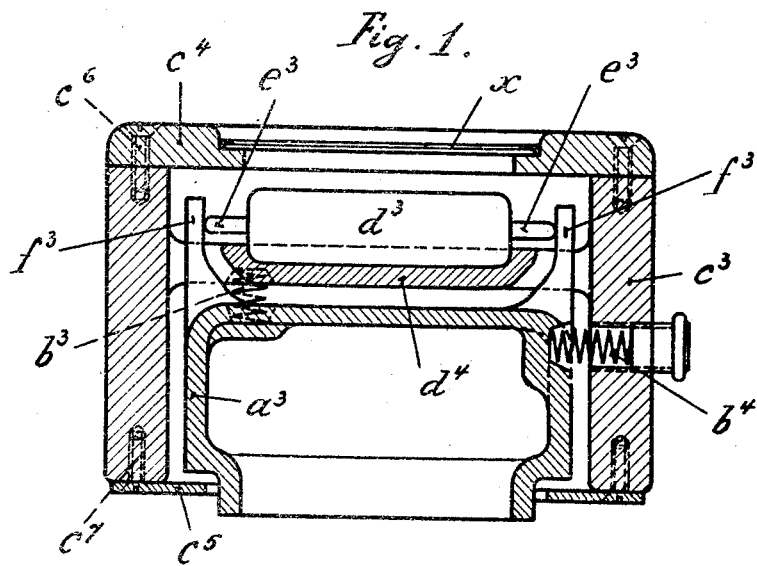
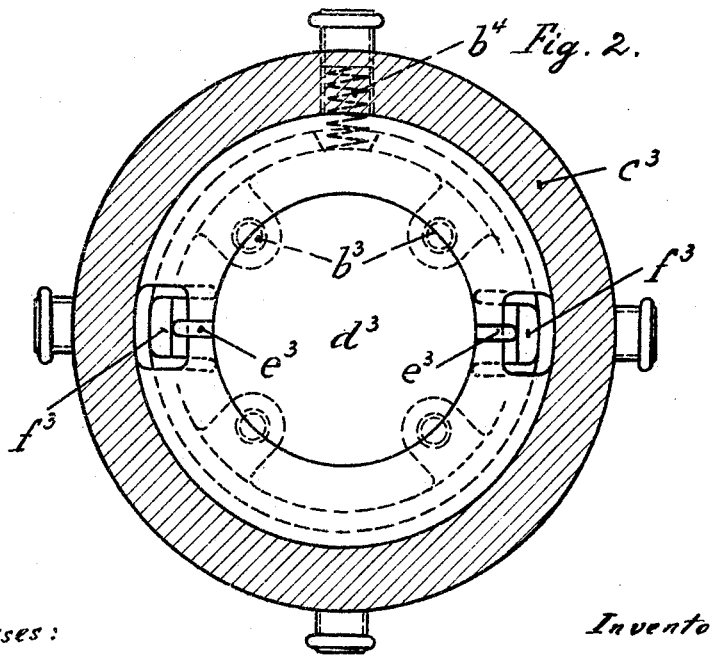

Jan. 18, 1927.  W. REGELEIN ET AL  1,614,573
OSCILLATION METER
Filed Nov. 17, 1925   2 Sheets-Sheet 2

Inventors:
Wilhelm Regelein
Arthur Glaubitz

Patented Jan. 18, 1927.

1,614,573

UNITED STATES PATENT OFFICE.

WILHELM REGELEIN AND ARTHUR GLAUBITZ, OF MULHEIM-RUHR, GERMANY.

OSCILLATION METER.

Application filed November 17, 1925, Serial No. 69,715, and in Germany February 2, 1925.

This invention relates to an improved oscillation meter, of a similar kind to that protected by our U. S. Patent No. 1,586,004 dated May 25th, 1926, said improved oscillation meter comprising essentially a light thin-walled casing taking-up the oscillations to be measured and within which a heavy inert mass is suspended by springs while the oscillations occurring between said casing and the inert mass are perceptible by means of a measuring apparatus inserted between them.

According to the present invention, the inert mass forms a heavy case enclosing a supporting member or socket of light mass which is to take-up the oscillations to be measured, the measuring apparatus being inserted between said case and socket.

Figure 3:
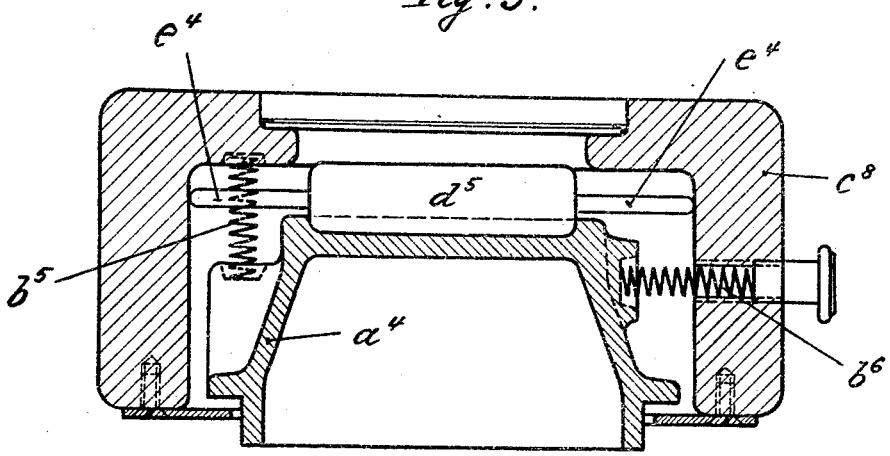
Figure 4:
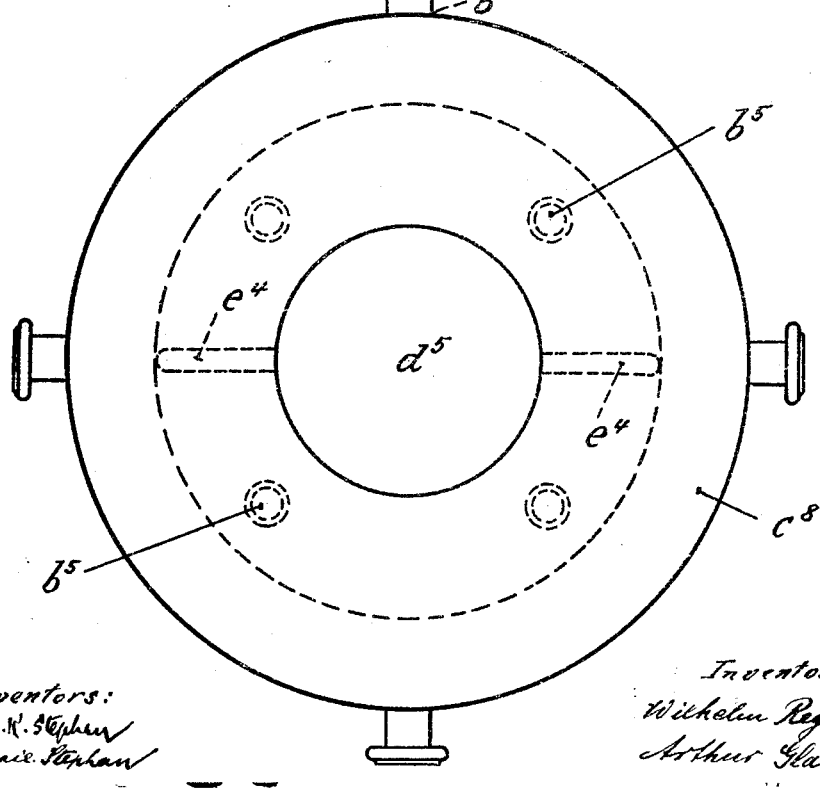

In the accompanying drawings; Figs. 1 and 2 are respectively a perpendicular central section through and a sectional plan view of, the improved oscillation meter, while Figs. 3 and 4 are respectively a perpendicular central section through, and a plan view of, a modification thereof.

Referring to Figs. 1 and 2 the heavy inert mass $c^3$ forms the casing for the oscillation meter, and it is suspended by means of fine perpendicular supporting springs $b^3$ and radial springs $b^4$ from a socket $a^3$ of light mass which somewhat projects therefrom at its lower end, with which it is placed upon the supporting base the oscillations of which are to be determined and measured. Said socket carries integral arms $f^3$ with contact faces thereon, which directly act upon contact-pins $e^3$ of the measuring apparatus $d^3$ of any appropriate type. The latter is carried by an integral cup $d^4$ of the caselike inert mass $c^3$, or in any other appropriate way.

The caselike inert mass $c^3$ is provided at the top and bottom with an annular cover $c^4$ and $c^5$ respectively detachably fastened thereon by means of screws $c^6$, $c^7$, the upper cover $c^4$ having a glass sash $x$ therein to allow an inspection of the interior of the case from above.

A special advantage of the improved oscillation meter lies in the fact that, when lifting the apparatus from its supporting base, that is when the same is not in its position of use, the socket $a^3$ is, by action of the fine perpendicular springs $b^3$, caused to bear directly upon the cover $c^5$ so that for a transportation of the apparatus special fastening of the movable parts to each other is not necessary. Preferably, for transporting the apparatus, it is turned upside down, the fine perpendicular springs $b^3$ lifting then the socket $a^3$ and forcing the same also against the cover $c^5$ of the inert mass $c^3$, thus locking it thereon.

Referring to Figs. 3 and 4 also in this example, the heavy inert mass $c^8$ forms the casing for the oscillation meter, and it is suspended by means of fine perpendicular supporting springs $b^5$ and radial springs $b^6$ from a socket $a^4$ of light mass, of which in this case the upper surface is cup-shaped for a reception of the measuring apparatus $d^5$ therein, while the contact-pins $e^4$ of the latter are directly in slight contact with the inner walls of the caselike inert mass $c^8$. This arrangement has the same special advantage as that above explained with reference to that illustrated in Figs. 1 and 2.

Owing to the casing $c^3$ or $c^8$ being rather strong, a very handy and compact apparatus that cannot easily be destroyed, is created.

Obviously, and to be understood without further illustration, the measuring apparatus can be formed as or be replaced by a recorder for registering the oscillations.

What we claim, is:

1. An oscillation meter comprising, in combination, a caselike heavy inert mass, a socket of light mass enclosed by said inert mass and adapted to take-up the oscillations to be measured, the lower end of said socket projecting somewhat from said caselike inert mass, fine perpendicular and radial supporting springs intervening between said inert mass and said socket, a measuring apparatus inserted between said inert mass and said socket, and contact-pins on the latter creating a slight contact between said socket and said iner mass, substantially as set forth.

2. An oscillation meter as specified in claim 1, in which said measuring apparatus is carried by said socket, substantially as set forth.

3. In an oscillation meter as specified in claim 1, an annular fixed cover for said case-like inert mass against which said light socket is pressed by action of said fine perpendicular springs when the apparatus is not in its position of use, substantially as set forth.

In testimony whereof we have hereunto set our hands.

WILHELM REGELEIN.
ARTHUR GLAUBITZ.